United States Patent
Dicle et al.

(10) Patent No.: US 12,497,072 B2
(45) Date of Patent: *Dec. 16, 2025

(54) GENERATING CORRECTED FUTURE MANEUVER PARAMETERS IN A PLANNER

(71) Applicant: Motional AD LLC, Boston, MA (US)

(72) Inventors: Caglayan Dicle, Melrose, MA (US); Sammy Omari, Pittsburgh, PA (US); Nanxiang Li, Livermore, CA (US); Sang Uk Lee, Cambridge, MA (US); Eric Wolff, Zephyr Cove, NV (US)

(73) Assignee: Motional AD LLC, Boston, MA (US)

(*) Notice: Subject to any disclaimer, the term of this patent is extended or adjusted under 35 U.S.C. 154(b) by 249 days.

This patent is subject to a terminal disclaimer.

(21) Appl. No.: 18/127,973

(22) Filed: Mar. 29, 2023

(65) Prior Publication Data
US 2024/0075951 A1  Mar. 7, 2024

Related U.S. Application Data

(63) Continuation of application No. 17/808,394, filed on Jun. 23, 2022, now Pat. No. 11,643,108.

(51) Int. Cl.
*B60W 60/00* (2020.01)
*B60W 50/00* (2006.01)
(Continued)

(52) U.S. Cl.
CPC .... *B60W 60/0011* (2020.02); *B60W 50/0097* (2013.01); *G06N 3/084* (2013.01); *G06T 11/40* (2013.01); *B60W 2556/10* (2020.02)

(58) Field of Classification Search
None
See application file for complete search history.

(56) References Cited

U.S. PATENT DOCUMENTS

| 10,829,149 B1 | 11/2020 | Garimella et al. |
| 11,042,163 B2 | 6/2021 | Chen et al. |

(Continued)

FOREIGN PATENT DOCUMENTS

| DE | 102020129456 | 5/2021 |
| KR | 10-2021-0061461 | 5/2021 |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Abdhesh K Jha
(74) *Attorney, Agent, or Firm* — Fish & Richardson P.C.

(57) ABSTRACT

Provided are methods for generating future maneuver parameters in a planner, which include receiving at least one first set of parameters associated with one or more previous maneuvers of a vehicle and at least one second set of parameters associated with a maneuver goal of the vehicle, generating, using the first and second sets of parameters, a future maneuver parameter corresponding to a future maneuver of the vehicle, training at least one data model by comparing the generated future maneuver parameter to one or more reference maneuver parameters, generating, based on training, a corrected future maneuver parameter. The corrected future maneuver parameter includes a future maneuver of the vehicle and a correction to the future maneuver of the vehicle. The first set of parameters includes the generated corrected future maneuver parameter, which is used to correct at least one first parameter. The training is executed using the corrected first parameter.

23 Claims, 15 Drawing Sheets

(51) Int. Cl.
*G06N 3/08* (2023.01)
*G06N 3/084* (2023.01)
*G06T 11/40* (2006.01)

(56) References Cited

U.S. PATENT DOCUMENTS

| | | | |
|---|---|---|---|
| 11,535,248 | B2 | 12/2022 | Phan et al. |
| 11,636,375 | B2 * | 4/2023 | Olabiyi ............... G08G 1/0129 706/12 |
| 11,643,108 | B1 | 5/2023 | Dicle et al. |
| 2018/0120843 | A1 | 5/2018 | Berntorp et al. |
| 2019/0185011 | A1 | 6/2019 | Zheng et al. |
| 2020/0156632 | A1 | 5/2020 | Ding et al. |
| 2021/0309261 | A1 | 10/2021 | Rosales et al. |
| 2021/0380142 | A1 | 12/2021 | Ramamoorthy et al. |
| 2022/0063614 | A1 | 3/2022 | Kim |
| 2022/0204018 | A1 | 6/2022 | Suplin et al. |

FOREIGN PATENT DOCUMENTS

| | | |
|---|---|---|
| KR | 10-2021-0074366 | 6/2021 |
| KR | 10-2321796 | 11/2021 |
| KR | 10-2022-0026656 | 3/2022 |
| WO | WO 2022/016583 | 1/2022 |

OTHER PUBLICATIONS

Zhou et al. "Exploring Imitation Learning for Autonomous Driving with Feedback Synthesizer and Differentiable Rasterization" 2021 IEEE/RSJ International Conference on Intelligent Robots and Systems (IROS) Sep. 27-Oct. 1, 2021. Prague, Czech Republic (Year: 2021).

* cited by examiner

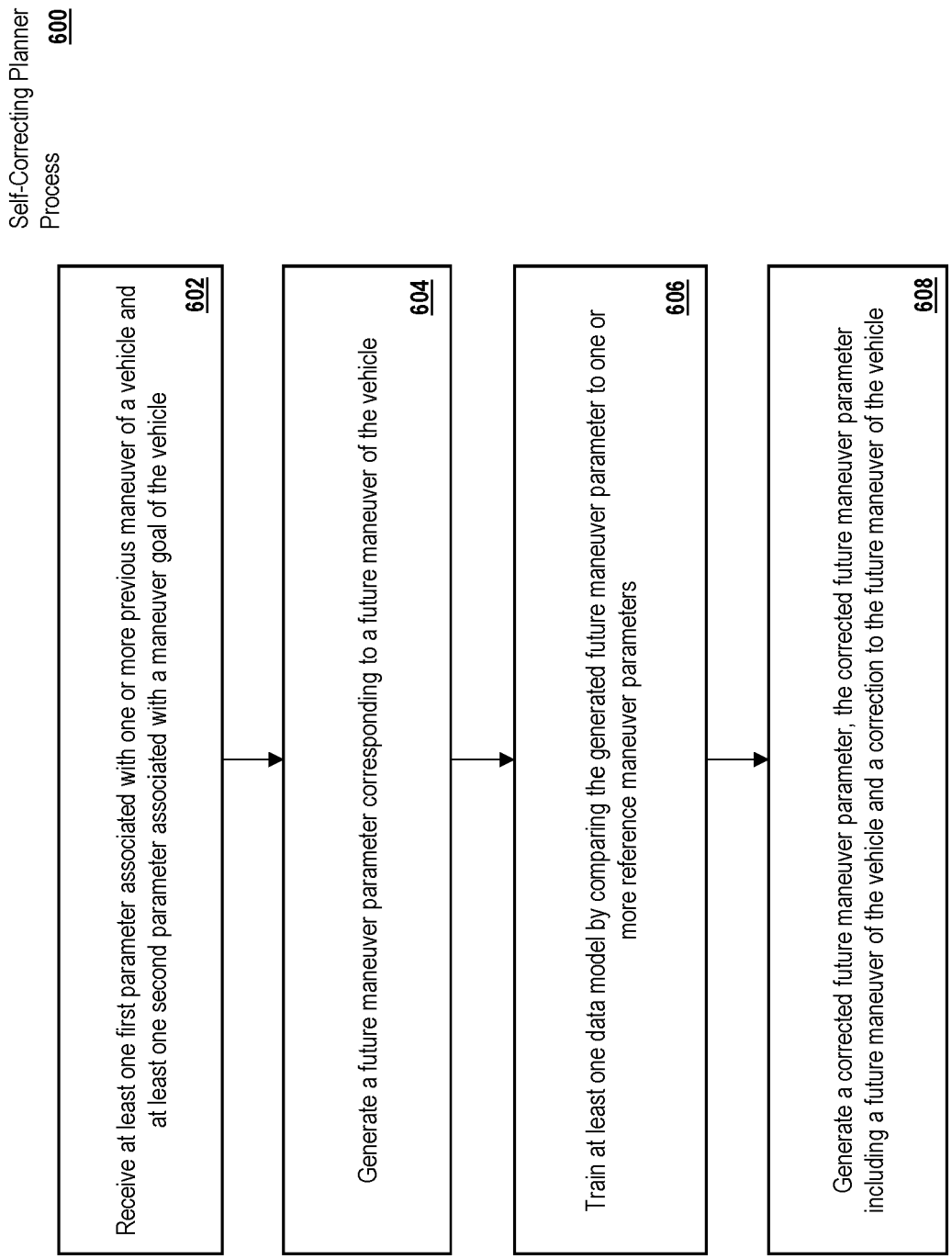

GENERATING CORRECTED FUTURE MANEUVER PARAMETERS IN A PLANNER

RELATED APPLICATION

This application is a continuation application of U.S. patent application Ser. No. 17/808,394 filed on Jun. 23, 2022, the entire content of which is hereby expressly incorporated by reference herein.

BACKGROUND

An autonomous vehicle is capable of sensing its surrounding environment and navigating without human input. Upon receiving data representing the environment and/or any other parameters, the vehicle performs processing of the data to determine its movement decisions, e.g., stop, move forward/reverse, turn, etc. The decisions are intended to safely navigate the vehicle along a selected path to avoid obstacles and react to a variety of scenarios, such as, presence, movements, etc. of other vehicles, pedestrians, and/or any other objects.

BRIEF DESCRIPTION OF THE FIGURES

FIG. 6 illustrates an example process for generating self-correction in a planner component of a vehicle, according to some embodiments of the current subject matter.

DETAILED DESCRIPTION

Figure 1:
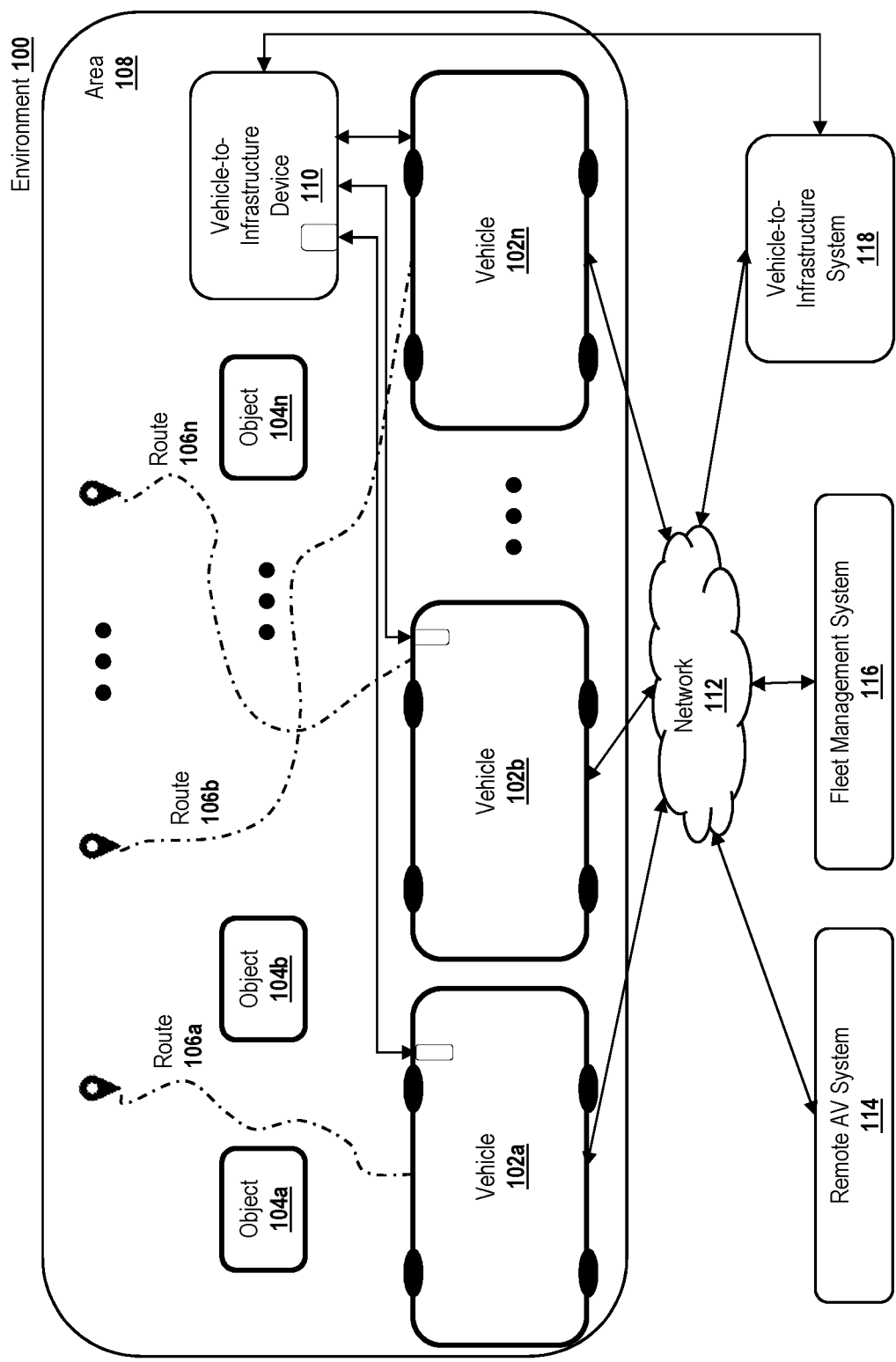
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

A vehicle (e.g., an autonomous vehicle) includes sensors that monitor various parameters associated with the vehicle. For example, some sensors (e.g., cameras, LIDAR sensors, RADAR sensors, SONAR sensors, etc.) monitor/detect changes occurring in the vehicle's environment (e.g., actions and/or presence of other vehicles, pedestrians, street lights, etc.). The information/data received from the sensors is used by the vehicle's controller (or any other processing component) that incorporates a planner component ("planner") to determine path of travel, direction, speed, and/other movement parameters.

To reduce the effect of errors, a planner, during training, performs self-correction by comparing its future outputs to a reference output (which can be a predetermined set of vehicle maneuver values that may be defined by an "expert driver"). A planner is causal recursive training system whose output depends on previous and/or current inputs, e.g., a vehicle's current direction of travel is used by the planner to determine (or otherwise influence) its future direction of travel. Since errors occur when determining a future output of the planner (e.g., a vehicle's direction of travel should have been 2 degrees to the left of a curb) and the planner's input includes future outputs and associated errors, the effect errors can be substantially amplified if not corrected.

The difference between the future output and the reference output corresponds to an error correction value. The future output and the error correction values are provided to the planner, during a training phase, as input to reduce the accumulating effect of errors. To perform the comparison, one or more features related to the vehicle and/or surrounding environment (e.g., RouteCenterlineProximity, HeadingAlignment, EgoDisplacements, etc.) are extracted from the future output and a vector containing values of these features is generated and rasterized. The planner then performs comparison of the generated/rasterized vector and a vector containing reference values to determine an error correction vector, which, along with future maneuver output, is looped back to repeat the above process. The process may be repeated continually or at predetermined points in time.

In some embodiments, one or more processors (e.g., ego vehicle's arbitration unit, controller, etc.) receive at least one first set of parameters (e.g., current, past maneuver(s) of the ego vehicle, etc.) associated with one or more previous maneuvers of a vehicle (e.g., ego vehicle) and at least one second set of parameters (e.g., a maneuver goal of the vehicle) associated with a maneuver goal of the vehicle. Using the first and second sets of parameters, the processor(s) generate a future maneuver parameter corresponding to a future maneuver of the vehicle (e.g., the vehicle's controller determines future maneuvers of the vehicle; for example, entry of the ego vehicle into an adjacent lane, etc. The processor(s) (e.g., a planner component of the processor(s)) trains at least one data model (e.g., movement data model) by comparing the generated future maneuver parameter to one or more reference maneuver parameters (e.g., one or more reference maneuvers, as determined by an "expert driver"). Based on the training, the processor(s) generate a corrected future maneuver parameter. The corrected future maneuver parameter includes a future maneuver of the vehicle and a correction to the future maneuver of the vehicle. In some embodiments, to provide for an end-to-end training system that allows for correction of past parameters, the first set of parameters can include the generated corrected future maneuver parameter. The generated corrected future maneuver parameter is used to correct at least one first parameter in the first set of parameters (e.g., correcting past parameters, maneuvers, etc.). The processor(s) can then train the data model using the corrected first parameter.

In some embodiments, the current subject matter can include one or more of the following optional features. The processor(s) execute the generated corrected future maneuver of the vehicle. For example, a drive-by-wire (DBW) component of the vehicle can execute the corrected future maneuver upon completion of the training of the model.

In some embodiments, receiving of the first and second sets of parameters includes continuously receiving, subsequent to the executing, the generated corrected future maneuver parameter to correct one or more previously received first parameters. The planner of the vehicle executes a closed loop process, where any generated future maneuver parameters become inputs to the planner process as past maneuver parameters, i.e., first parameters. As stated above, this allows for correction of past parameters.

In some embodiments, the processor(s) also receive at least one third parameter associated with a state of the vehicle. For example, the third parameter corresponds to an environment and/or a scene input (e.g., pedestrian on the sidewalk, vehicle in an opposite lane, etc.). The training of the data model include training the data model using the future maneuver parameter, the third parameter (e.g., as related to the environment and/or scene), and one or more reference maneuver parameters. As such, training of the data model involves use of environment/scene data as input for training purposes.

In some embodiments, the above process further includes repeating of the receiving of the first and second sets of parameters, comparing of the generated future maneuver parameter and reference maneuver parameter(s), training of the data model, and generating of the corrected future maneuver parameter. Thus, the planner process is repetitive and corrected parameters are continuously supplied to the planner.

In some embodiments, at least one of the first and second parameters correspond to at least one feature associated with at least one maneuver of the vehicle. During the process, the processor(s) extract one or more features associated with the maneuvers for training purposes. The processor(s) then rasterize the extracted feature(s) and back-propagate them for training. The training of the data model also includes training the data model using at least one rasterized feature that can be associated with movement of the vehicle.

In some embodiments, executing of the corrected further maneuver includes executing the corrected future maneuver of the vehicle while the vehicle is operating. This allows generation of movements at drive time.

In some embodiments, the first and second sets of parameters include at least one of the following: a speed, a position, an acceleration, a direction of movement, and any combination thereof of the vehicle.

In some embodiments, at least one received first parameter is differentiable from at least one of: at least one previously received first parameter and at least one corrected first parameter. Alternatively, or in addition to, at least one received first parameter is differentiable from at least one anchor first parameter in the first set of parameters. The anchor first parameter can be associated with at least one of: at least one reference feature associated with at least one maneuver of the vehicle and at least one reference maneuver parameter.

By virtue of the implementation of systems, methods, and computer program products described herein, techniques for allowing self-correction and/or removal of errors that may be associated with maneuver planning and/or execution by a vehicle's controller, which, in turn, may avoid undesired consequences (e.g., accidents).

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
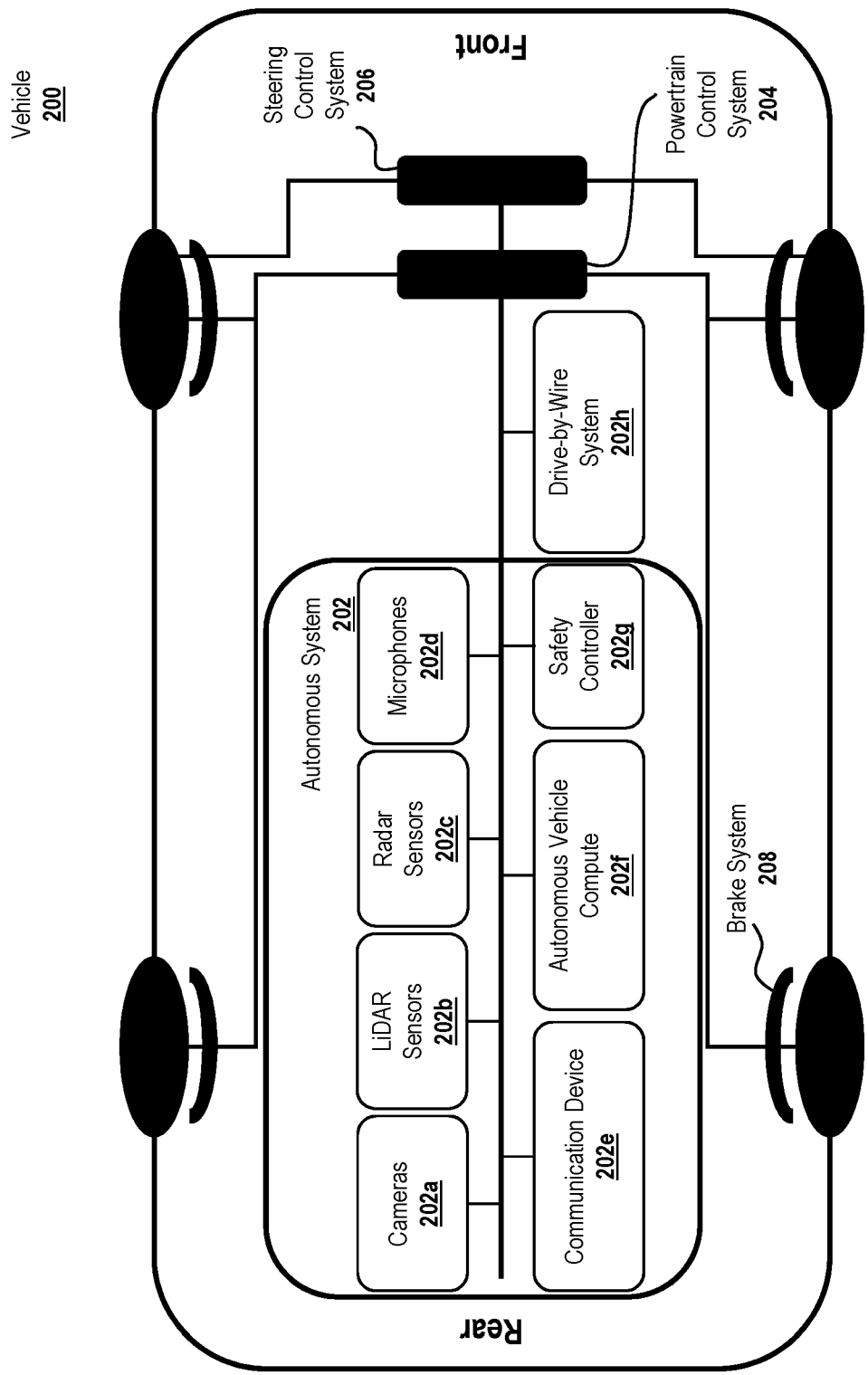
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
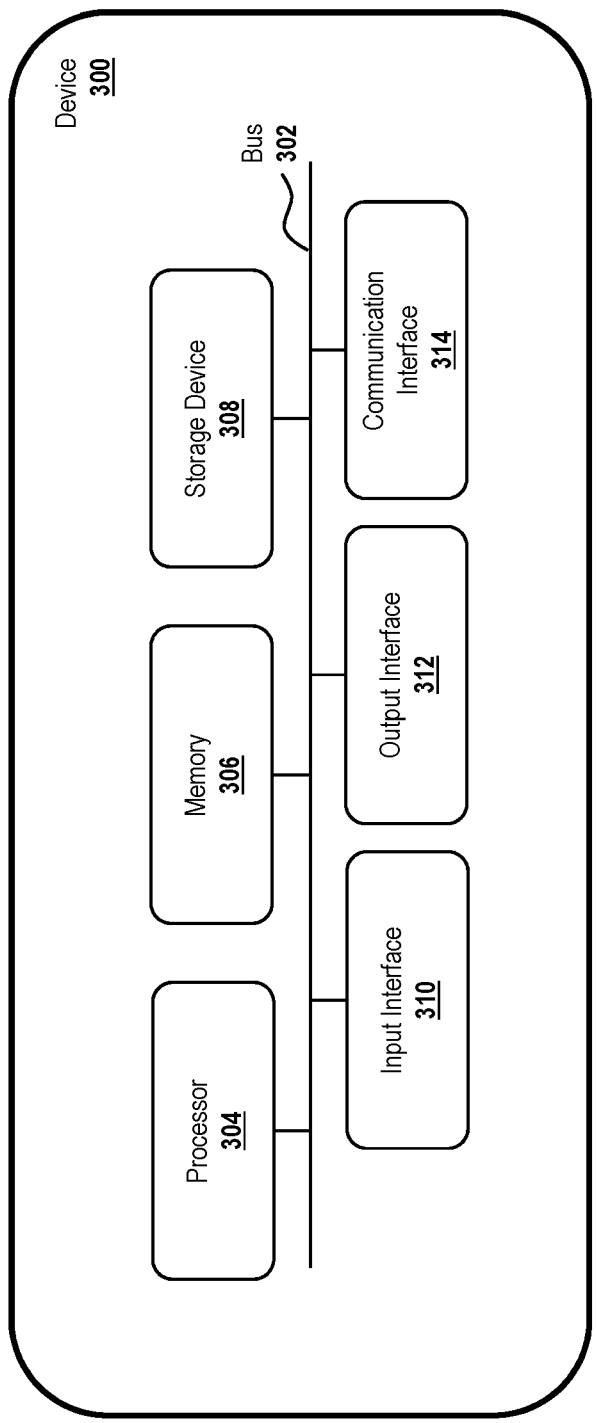
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of other devices/objects shown in FIG. 1, and/or one or more devices of network 112 (e.g., one or more devices of a system of network 112). In some embodiments, one or more devices of vehicles 102 (e.g., one or more devices of a system of vehicles 102), at least one device of other devices/objects shown in FIG. 1, and/or one or more devices of network 112 (e.g., one or more devices of a system of network 112) include at least one device 300 and/or at least one component of device 300.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
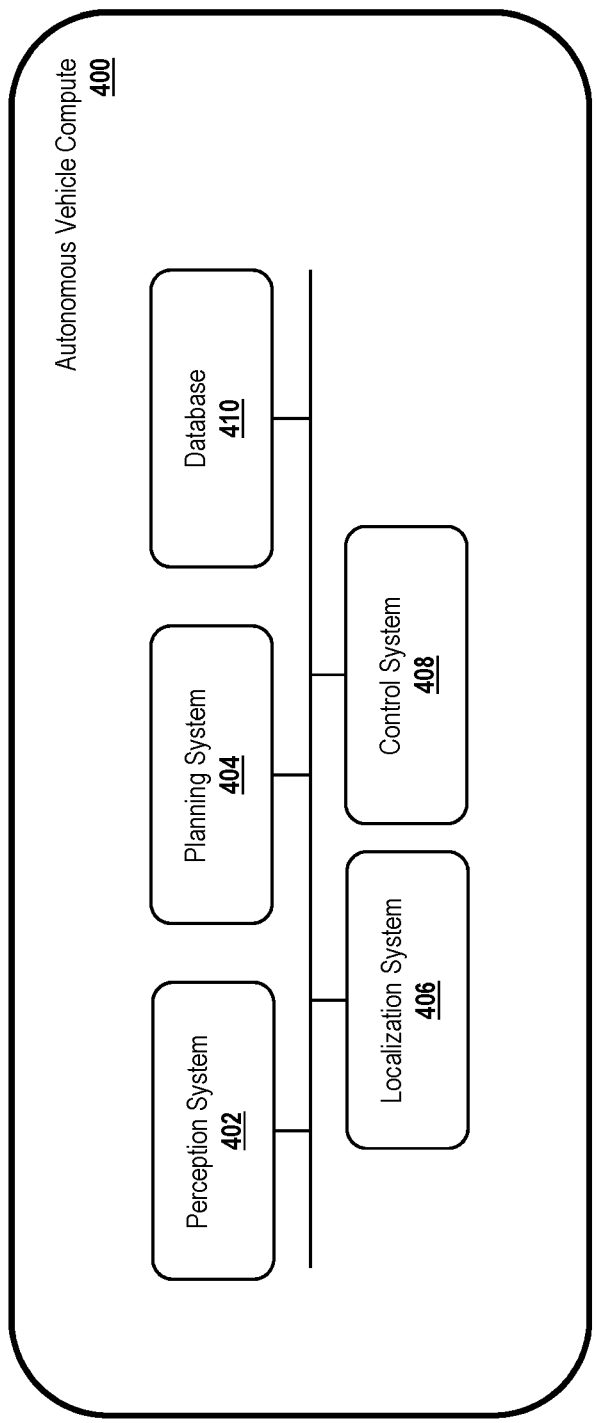
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
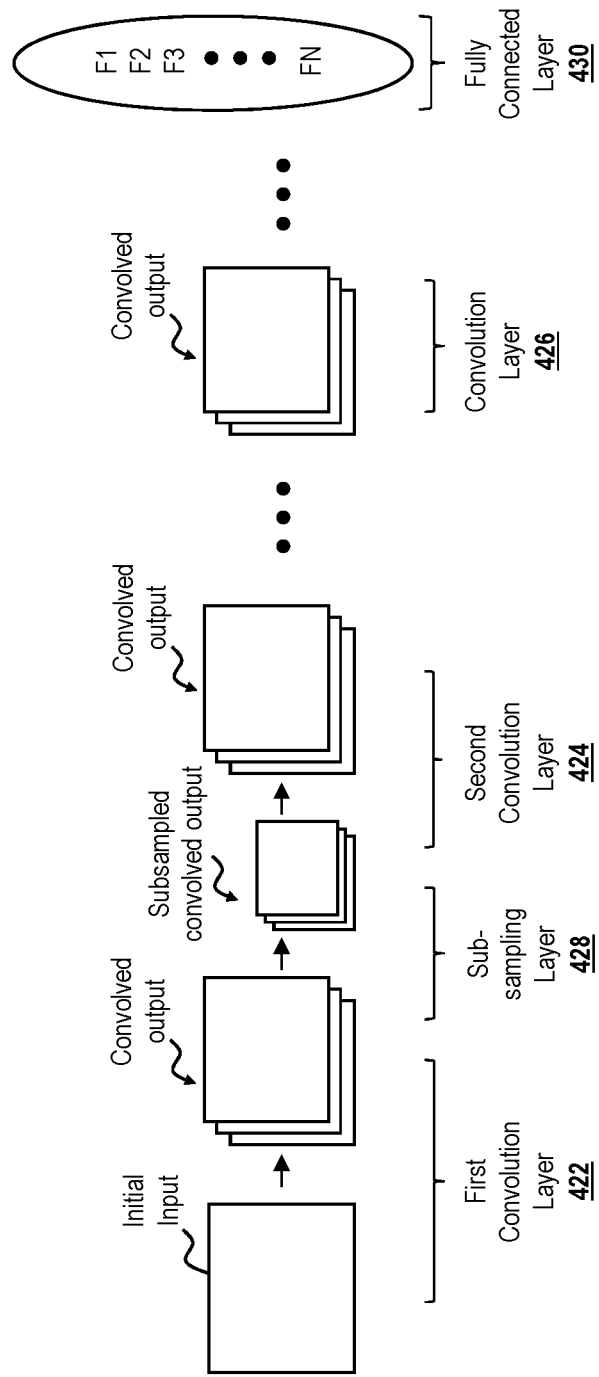
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of subsampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 420 normalizing sensor data (e.g., image data, LiDAR data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
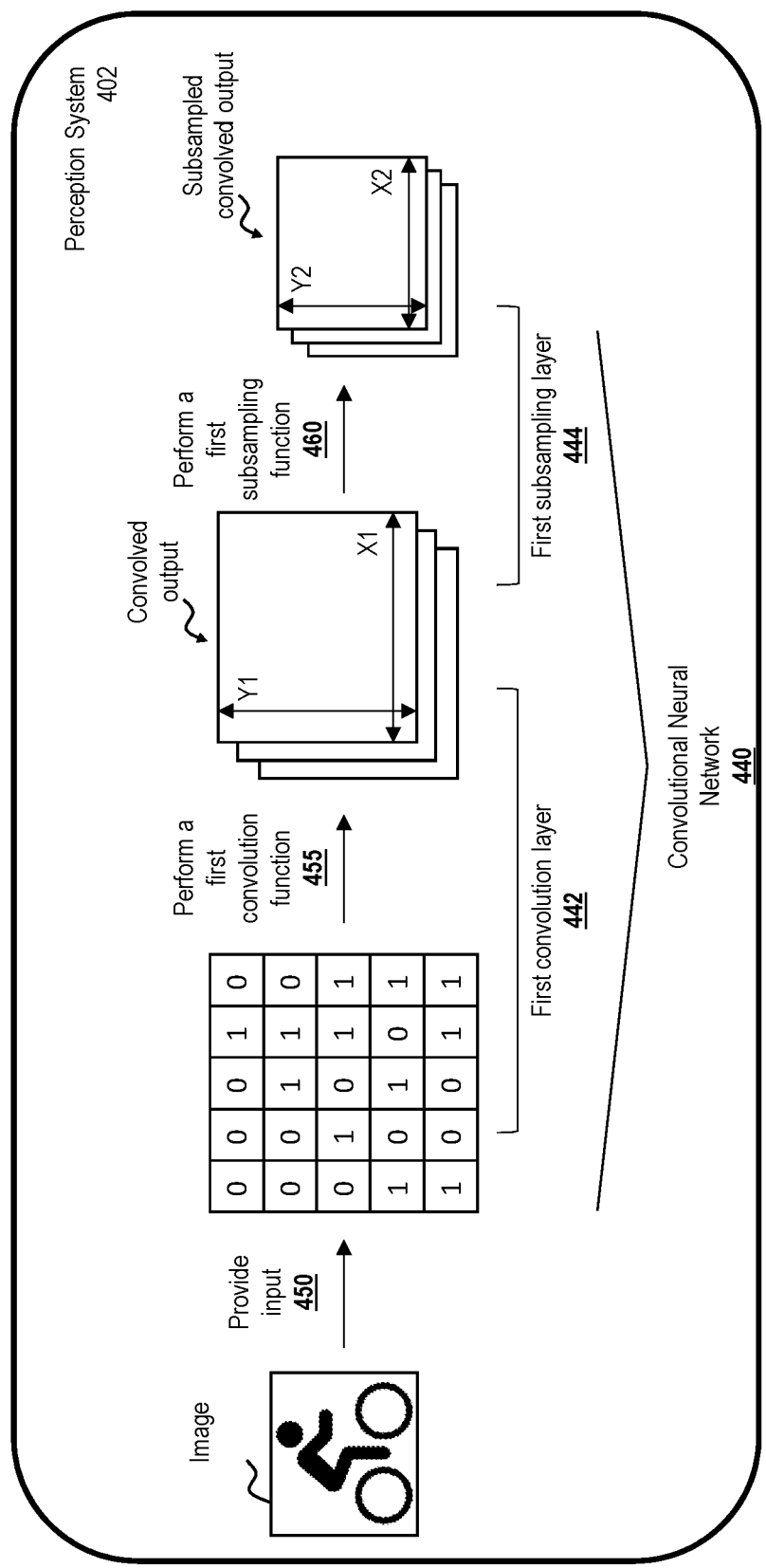
FIGS. 4C and 4D are a diagram illustrating example operation of a CNN.
Figure 4D:
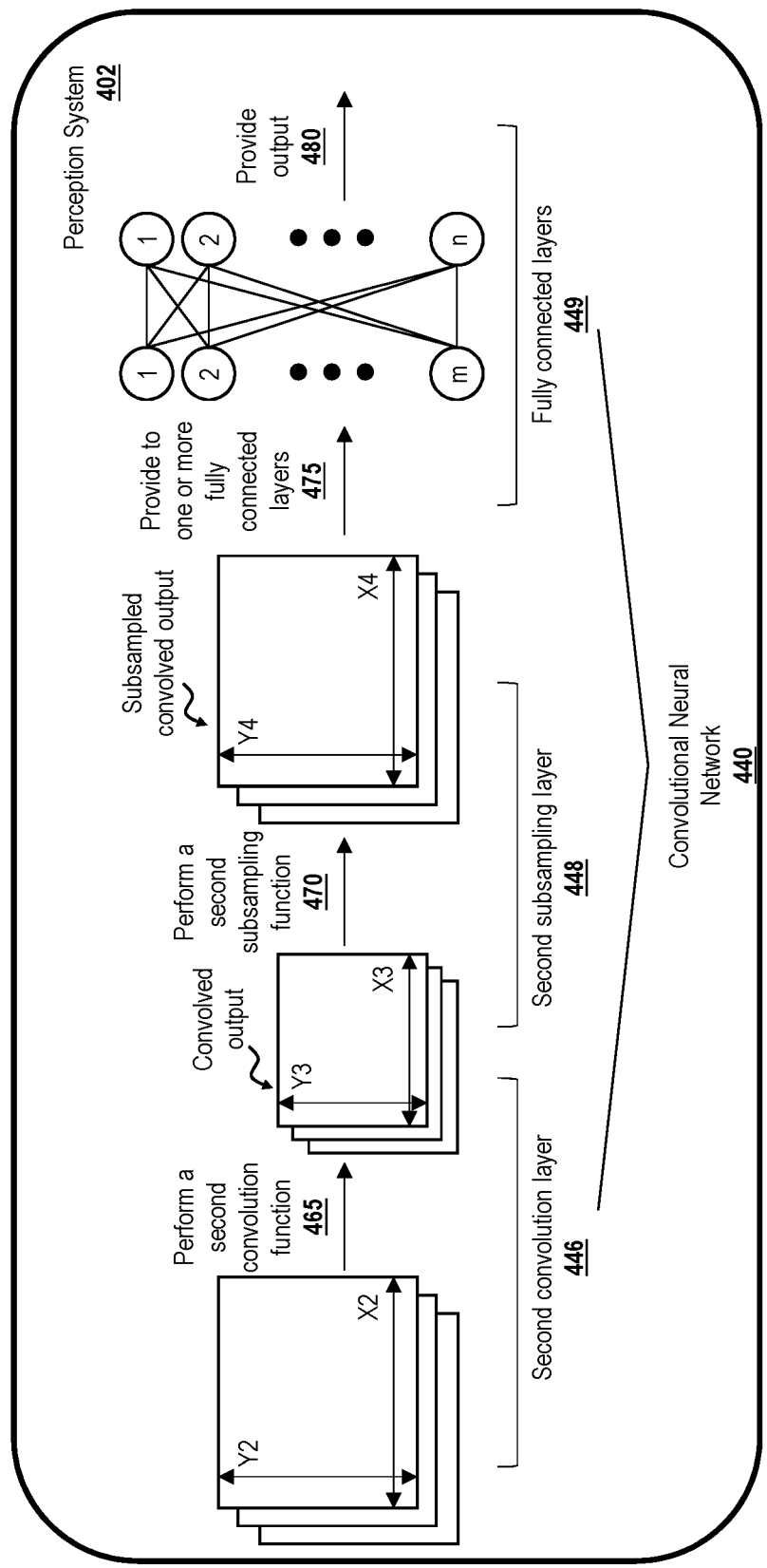

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like).

In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5A:
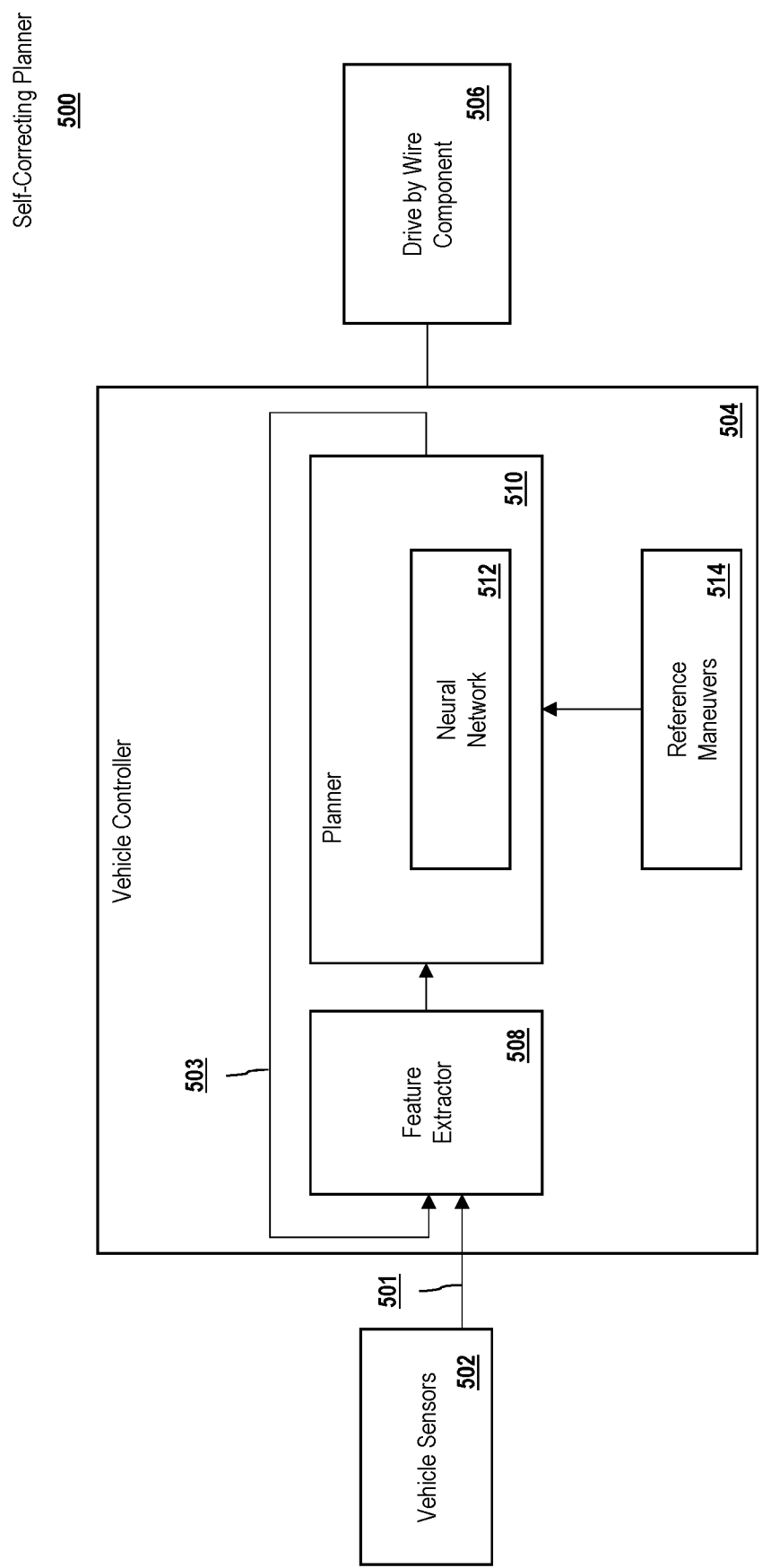
FIG. 5A illustrates an example of a system implementing a self-correcting planner, according to some embodiments of the current subject matter.

Referring now to FIG. 5A, illustrated is a diagram of an implementation of a system for generating one or more corrected future maneuver parameters in a planner. FIG. 6 is a flow chart illustrating an example of a process for generating corrected future maneuver parameters. FIGS. 5B-5G illustrate additional implementation details of generating correction to future maneuver parameters. Advantageously, the current subject matter can be configured to provide an end-to-end training system that enables correction of past parameters associated with movement of the vehicle using information and/or obtained from the future determinations, i.e., an output of the current subject matter system is used as an input to the processes performed by the system to correct previous and/or past input parameters and to train the system to generate better and/or more precise parameters for defining vehicle maneuvers.

As stated above, a vehicle (e.g., an autonomous vehicle) includes sensors that monitor various parameters associated with the vehicle. For example, some sensors monitor/detect changes occurring in the vehicle's environment, while others monitor/detect various aspects associated with operational aspects of the vehicle. Any information/data transmitted by the sensors to the vehicle's controller (or any other processing component) is used by the controller's planner component ("planner") to determine path of travel, direction, speed, and/other movement and/or maneuver parameters. Planners typically suffer from errors and thus, to reduce their effect (or amplification of error effects), the current subject matter executes training of an error correction data model to self-correct the planner. During training, received vehicle maneuver values are used as input and compared to a predetermined set of reference vehicle maneuver values (which are predefined, e.g., such as by an "expert driver") to determine an error correction value. The error correction value and a determined future maneuver value are back-propagated to the data model as an input for continuous, recursive training.

FIG. 5A illustrates an example of a system 500 implementing a self-correcting planner, according to some embodiments of the current subject matter. The system 500 can be incorporated into a vehicle (e.g., vehicle 102 shown in FIG. 1, vehicle 200 shown in FIG. 2, etc.). The system 500 includes one or more sensors 502, a vehicle controller 504, and drive-by-wire (DBW) component 506. The system 500 can also incorporate other components associated with operation of an autonomous vehicle (as described above). The vehicle controller 504 can include a feature extractor and rasterization component 508, a planner component 510 that includes a neural network component 512 (similar to those discussed above in connection with FIGS. 4B-4D), and a reference maneuvers component 514.

The vehicle's sensors 502 monitor various parameters and/or sets of parameters associated with the vehicle. The parameters can include, but are not limited to, parameters associated with vehicle's state, e.g., heading, driving speed, etc. Additionally, the parameters can include, but are not limited to, parameters associated with vehicle's health, e.g., tire inflation pressure, oil level, transmission fluid temperature, etc. The vehicle's sensors (e.g., camera, LIDAR, SONAR, etc.) can further monitor various parameters associated an environment surrounding the vehicle. These parameters can include, but are not limited to, parameters associated with other vehicles (e.g., speed, direction, etc.) and/or other objects (e.g., pedestrian stepping out on a roadway in front of the vehicle). The sensors 502 supply data for one or more measured/monitored parameters to the vehicle controller 504, at 501.

The sensor data 501 can be provided to the vehicle controller 504's feature extractor and rasterization component 508. The feature extractor and rasterization component 508 extracts one or more features from the received data, which also includes data related to one or more previous maneuvers of the vehicle. The features are related to data being received by the vehicle controller (e.g., direction, speed, etc.). The features are rasterized and then provided to the planner component 510. Additionally, the reference maneuver parameters 514 are provided to the planner component 510.

Using the planner component's neural network 512, the planner component 510 execute a recursive training of a maneuver data model and determine one or more future maneuver parameters (e.g., which can correspond to "increase speed by 2 miles per hour", "turn left 2 degrees", etc.) that the vehicle can execute. In addition to determining future maneuver parameters, the planner component 510 performs a comparison of the received input data, such as, previously determined maneuver parameters to the reference maneuver parameters 514 that are supplied to the planner component 510. Comparison of the previously determined maneuver parameters and the reference maneuver parameters 514 allows the planner component 510 to determine one or more correction values for correcting or adjusting the determined future maneuver parameters that have been determined by the planner component 510 (e.g., corresponding to "instead of turning left 2 degrees, turn left 1.5 degrees", etc.). In particular, during the comparison, one or more features related to the vehicle and/or surrounding environment (e.g., RouteCenterlineProximity, HeadingAlignment, EgoDisplacements, etc.) are extracted from the future output signal (i.e., output signal 503) and a vector containing values of these features is generated and rasterized. The planner component 510 then performs comparison of the generated/rasterized vector and a vector containing reference values 514 to determine an error correction vector, which, along with future maneuver output signal, is looped back to repeat the above process. The generated output signal 503 corresponds to the determined future maneuver parameter(s) and one or more correction value(s). The above process is then repeated.

The output signal 503 (i.e., the future maneuver parameter(s) and the error correction values) is provided to back to the planner component 510, during a training phase, as an input to reduce the accumulating effect of errors. The process may be repeated continually or at predetermined points in time.

In some embodiments, the generated output signal can be transmitted by the vehicle controller 504 to the drive-by-wire component 506 so that the vehicle can execute the determined maneuver subject to the determined correction(s). The above training process can be executed by the vehicle controller 504 while the vehicle is operating (i.e., at drive time). Alternatively, or in addition to, the training process can be executed while the vehicle is not operating.

Figure 5B:
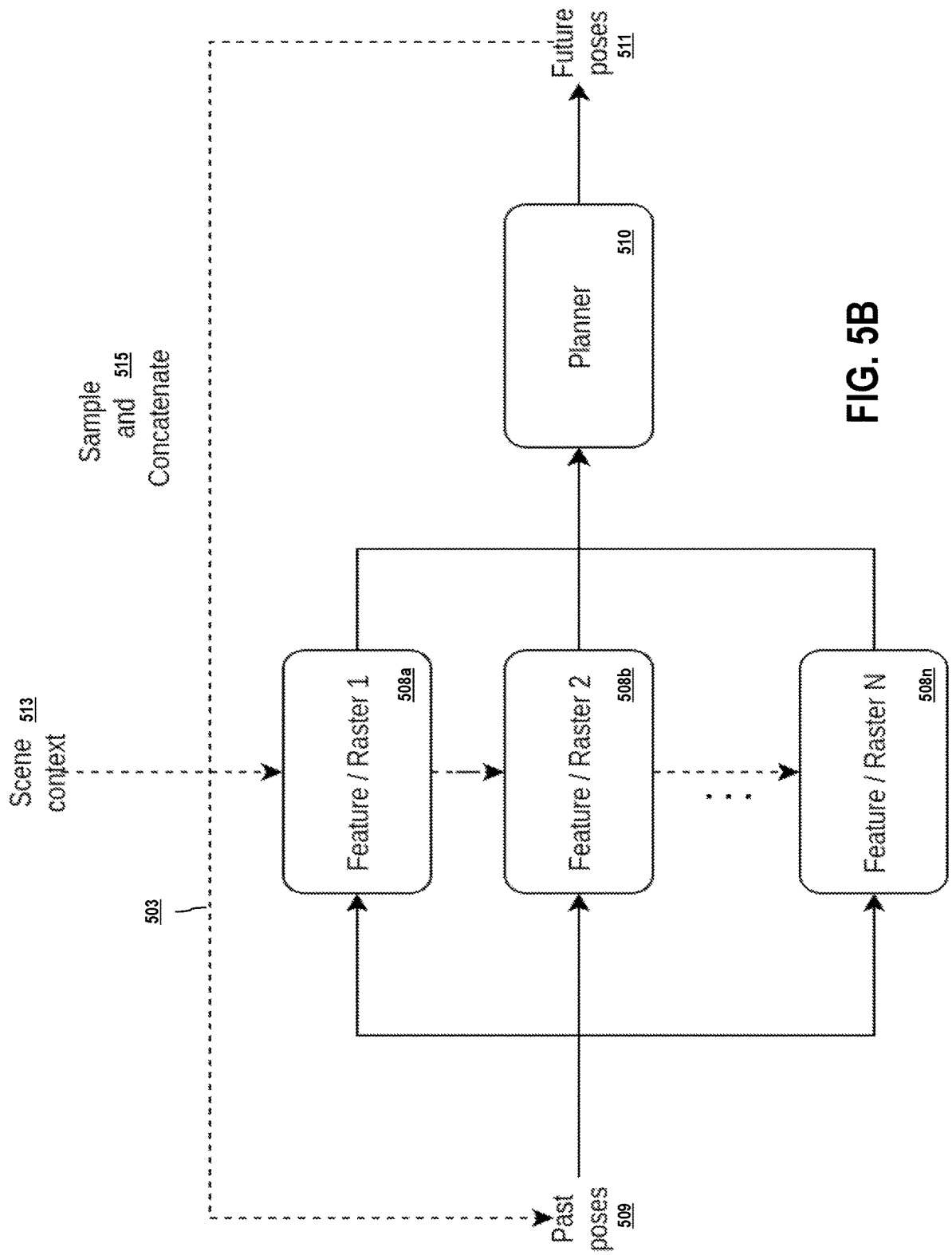
FIG. 5B illustrates additional details of the self-correcting planner system shown in FIG. 5A, as executed by its controller, according to some embodiments of the current subject matter.

FIG. 5B illustrates additional details of the self-correcting planner system 500 as executed by the controller 504 (as shown in FIG. 5A), according to some embodiments of the current subject matter. As shown in FIG. 5B, the feature extractor and rasterization component 508 can include one or more feature extractor and rasterization components 1, 2, . . . N 508(a, b, . . . n). The feature extractor and rasterization components 508 (a, b, . . . n) receive one or more previous and/or current maneuver parameters (also referred to as poses) 509.

Additionally, one or more parameters related to the scene context 513 are provided to the feature extractor and rasterization components 508 (a, b, . . . n). The scene context parameters 513 can correspond to parameters associated with environment surrounding the vehicle. By way of a non-limiting example, such parameters can refer to distance to the curb from the vehicle, presence of a pedestrian on a sidewalk, and/or any other parameters. The scene context parameters 513 can be extracted and rasterized as well.

Once extracted and rasterized, the parameters 509 and 513 serve as input to the planner component 510 (and its neural network 512 as shown in FIG. 5A). Using its neural network 512 (as shown in FIG. 5A), the planner component 510 generates one or more future poses parameters 511 as output. The future poses parameters 511 can be indicative of one or more future maneuvers that the vehicle can make. The future poses parameters 511 can be sampled and concatenated, at 515, and transmitted, at 503, or propagated back to the feature extractor and rasterization components 508 (*a, b, . . . n*) to become past poses parameters 509. Thus, as stated above, the process can continue recursively.

The planner component 510 can be configured to include one or more modules to process different inputs (e.g., past poses parameters 509, scene context parameters 513 that have been feature-extracted and rasterized) and combine them to generate an output corresponding to future poses of the ego vehicle. It should be noted, that at each processing loop or step (i.e., between inputting of past poses to processing of past poses to generating of future poses and to inputting of the generated future poses as past poses), the vehicle updates its pose with a future pose and that pose becomes the past pose of the vehicle. This feedback mechanism creates a recursion where the output is affected by its previous outputs. The feedback mechanism is advantageous as it mimics the real-world decision-making circumstances. Additionally, the configuration of the system 500 (as shown, for example, in FIG. 5A), provides a realistic autonomous vehicle design that can close a behavior gap in training and real-world inference.

Figure 5C:
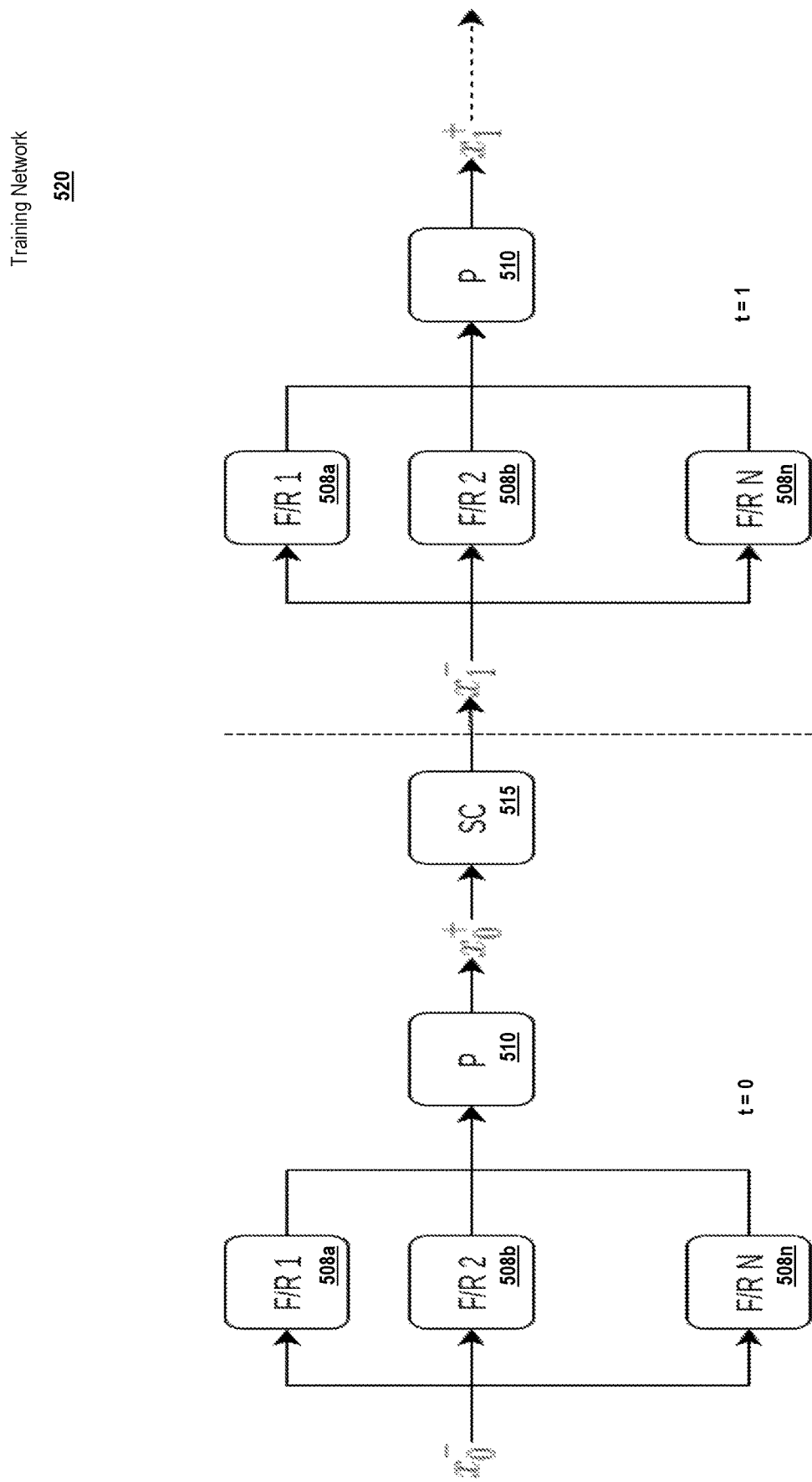
FIG. 5C illustrates a training network that can be used by the autonomous vehicle system (e.g., as shown, for example, in FIGS. 5A-B) during training, according to some embodiments of the current subject matter.

FIG. 5C illustrates a training network 520 that can be used by the autonomous vehicle system (e.g., as shown, for example, in FIGS. 5A-B) during training, according to some embodiments of the current subject matter. The training network 520 is a recursive network and includes one or more feature extractors and rasterization components 508 (*a, b, . . . , n*), the planner component 510, and the sample and concatenation component 515. The elements 508, 510, and 515 are engaged at processing inputs and generating outputs during time intervals t=0, 1, . . . Due to recursive nature of the system shown in FIG. 5C, an output of the sample and concatenation component 515 generated at time t=0 serves as an input to feature extractor and rasterization components 508 at time t=1.

In particular, the processing can start from an initial set of parameters corresponding to past poses $x_0^-$, at time t=0. Feature extractor and rasterization components 508 and the planner component 510 generate an output $x_0^+$ and feed it to the sample and concatenation component 515. The output of the sample and concatenation component 515, $x_1^-$, becomes input to the feature extractor and rasterization components 508, at time t=1, as shown in FIG. 5C. Thus, at each next time, the previous pose parameters become the last pose parameters that are fed to the network. During the training, the recursive process can be carried out a predetermined number of times, t. Alternatively or in addition, the process can be carried out infinitely and/or as long as desired.

In addition to providing future poses parameters as input, the system 500 also determines an error, which is propagated back along with the output future poses parameters. In some cases, the error can be propagated back only if there is a subset of differentiable components at each stage. The error may be determined as a change in the output to the change in the input. For example, if a function (as for instance, related to feature extraction and rasterization stage) is defined as y=$f$(x), the change or derivative is determined as dy=$f$'(x)dx, thus, dx=dy/$f$'(x). As such, given an error in the output dx, the error in the input can be also determined and eventually used to update the input dx. This output to is helpful in differentiating between various data components throughout the process executed by the system 500.

In some embodiments, some features (e.g., RouteCenterlineProximity, HeadingAlignment, EgoDisplacements) can be easily differentiated feature, as they are built on differentiable functions. For other features (e.g., binary features, e.g., OnDrivableArea) can be approximated by differentiable piecewise differentiable counterparts. Differentiation of features allows establishing of a relationship from the change in the output to the change in the input so that an appropriate corrective signal can be propagated back. The following is a discussion of feature differentiation relationships.

The following equation relates a change in the input to the output:

$$\Delta y = f(x+\Delta x) - f(x)$$

where x is the input, y is the output, and $\Delta$ represents changes in these respective variables. If function $f$ is differentiable, $\Delta x$ can be easily obtained from $\Delta y$. However, if the function is not differentiable, the $\Delta x$ can be obtained using the following (assuming function $f$ has an inverse function $f^{-1}$):

$$f^{-1}(\Delta y) = f^{-1}(f(x+\Delta x) - f(x))$$

$$f^{-1}(\Delta y) = f^{-1}(f(x+\Delta x)) - f^{-1}(f(x))$$

$$f^{-1}(\Delta y) = x + \Delta x - x$$

$$f^{-1}(\Delta y) = \Delta x$$

Thus, the inverse function can be applied to the error signal $\Delta y$ to determine a correction for $\Delta x$. In some example, non-limiting embodiments, the pairs of functions $f$ and $f^{-1}$ can be selected as follows: $f$: pd $f(\mu = x)$ corresponding to a probability distribution with a mean equal to x and $f^{-1}$: E[.] corresponding to the expected value. Thus, a raster image can be generated using $f(x)$. The system 500 can consume the generated raster image together with other inputs and generate a correction to the image during backpropagation, from which $\Delta x$ can be obtained by applying $f^{-1}$ ($\Delta y$).

In some embodiments, differentiation of the features can be used to ensure that inputs to the self-correcting planner are differentiable (e.g., different from ego vehicle's state). Otherwise, if the inputs are the same, the back propagation processes may be inaccurate and/or may fail. In particular, the parameter differentiability can be determined in relation to any previous inputs to the current subject matter process and/or any corrections generated as a result of the current subject matter process. Further, in some example embodiments, an anchor and/or a reference can be defined for differentiability purposes, where such anchor/reference may be associated with one or more reference (e.g., "expert") features associated with one or more expert maneuvers of the vehicle and/or any other parameters associated with vehicle maneuvers.

Figure 5D:
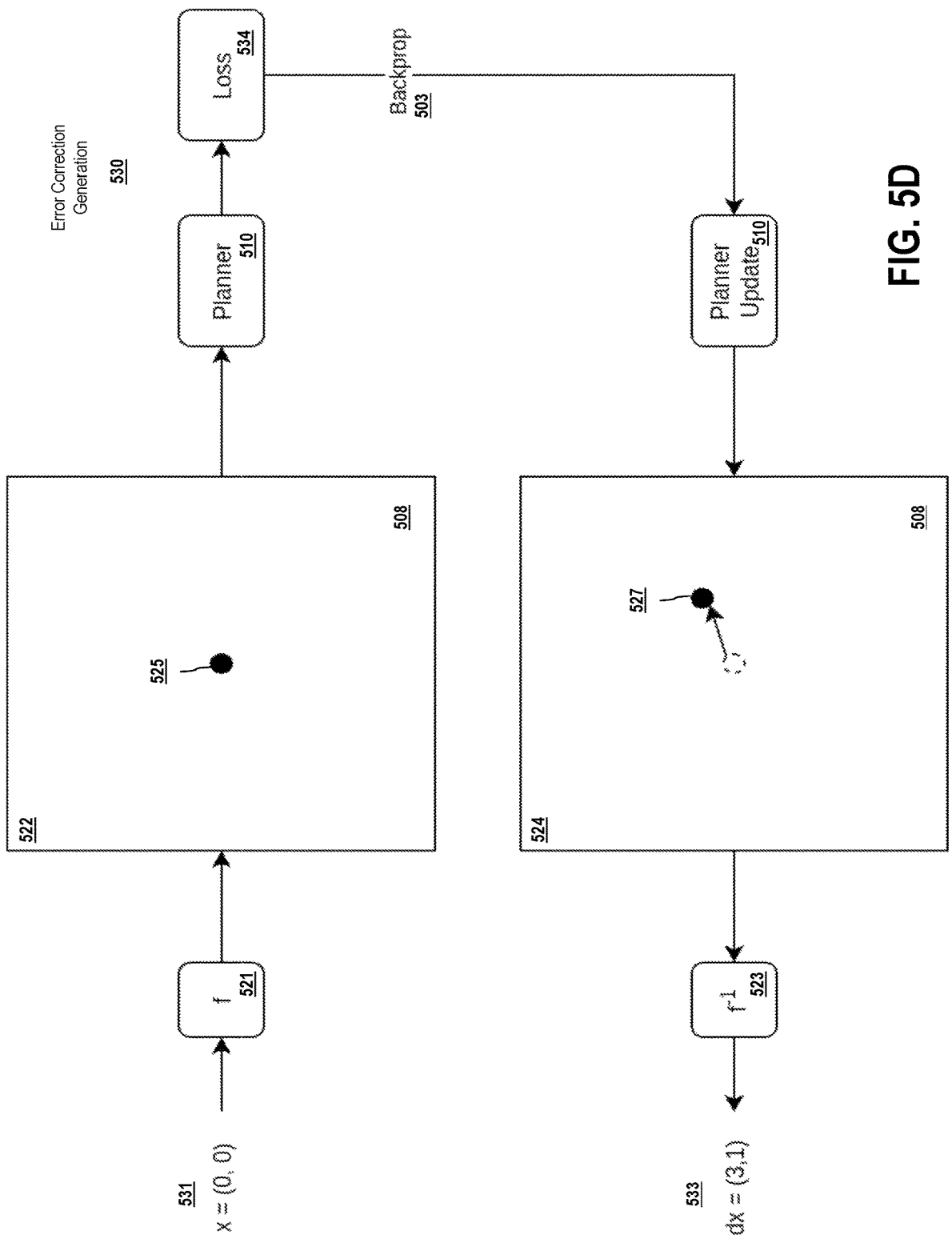
FIG. 5D illustrates process for generating correction(s) to input signals, according to some embodiments of the current subject matter.

FIG. 5D illustrates process 530 for generating correction(s) to input signals, according to some embodiments of the current subject matter. As shown in FIG. 5D, the feature extractor and rasterization component 508 and planner component 510 of the system 500 shown in FIG. 5A can be configured to execute the process 530. The process 530 can begin with an input 531, e.g., x=(0, 0). A function $f$ 521 can be applied to the input 531 and submitted to the feature extractor and rasterization component 508 to generate an image 525. The image 525 is submitted to the planner component 510. A reference parameter (e.g., "loss" as determined based on "expert driver" parameters) can be applied to the output of the planner component 510. The planner component output can be updated to generate an updated image 527 by the feature extractor and rasterization component 508. At that point, an inverse of the function $f$ 521, i.e., function $f^{-1}$ 523, is applied to generate a corrective signal 533, i.e., $\Delta x=(3, 1)$. The process 530 can be executed using an additional raster layer that can be added to the raster set for propagating back the pose correction signal. As such, the information that may be fed to the planner may be redundant and may already be present in other raster layers. However, the specific raster layer used for propagation of corrective signal can allow to transmit the pose correction information during the backpropagation. Alternatively, or in addition to, backpropagation can provide correction signal through other layers as well.

Figure 5E:
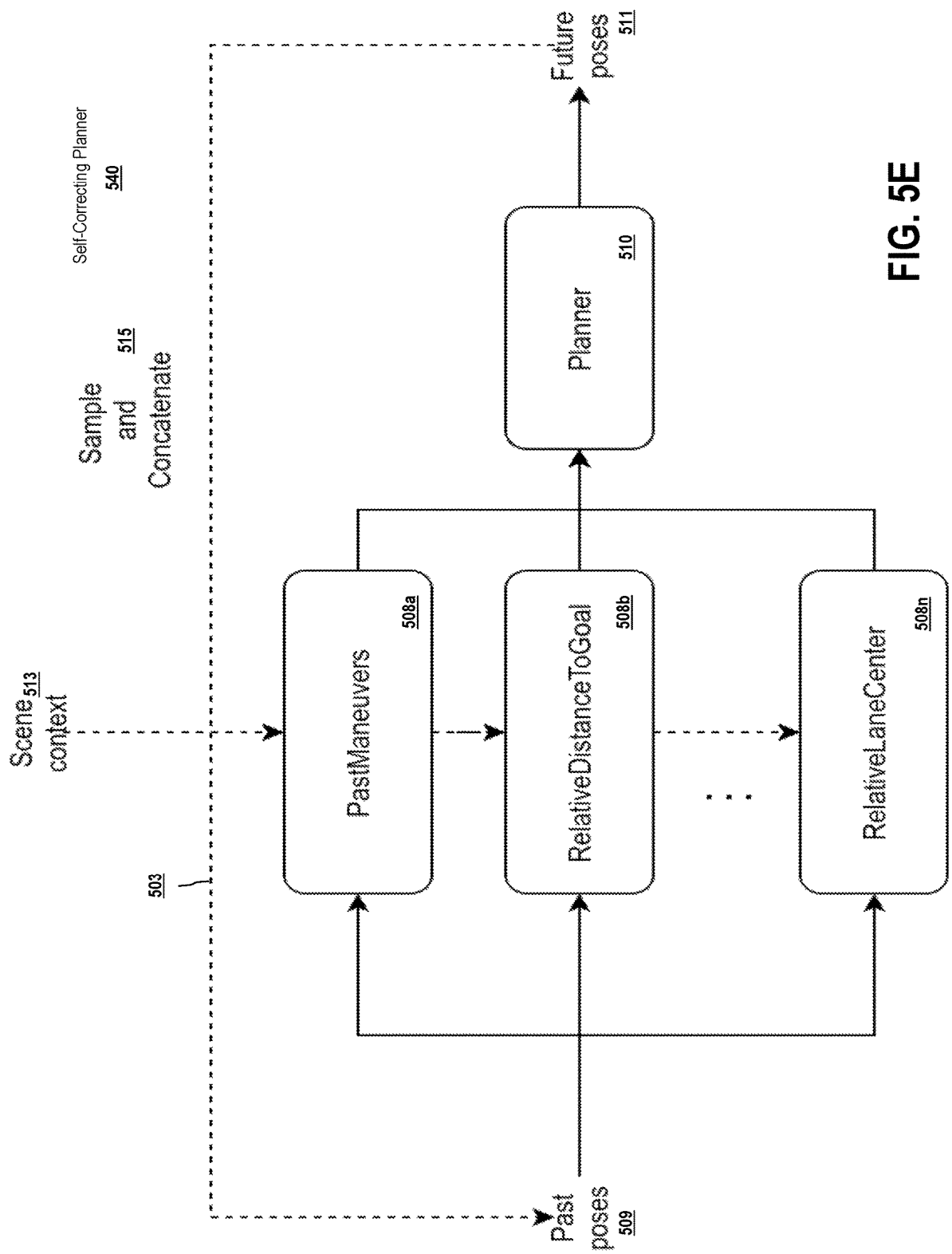
FIG. 5E illustrates an example experimental implementation of the self-correcting planner system (as shown in FIG. 5A), according to some embodiments of the current subject matter.

FIG. 5E illustrates an example experimental implementation 540 of the self-correcting planner system 500 (as shown in FIG. 5A), according to some embodiments of the current subject matter. As shown in FIG. 5E, the feature extractor and rasterization components 1, 2, . . . N 508(a, b, . . . n) receive one or more previous and/or current maneuver parameters (also referred to as poses) 509. In this case, the feature extractor and rasterization component 508a is configured to process past maneuvers of the vehicle ("PastManeuvers"); the feature extractor and rasterization component 508b is configured to process relative distance to goal of the vehicle ("RelativeDistanceToGoal"), which can include an intended destination of the vehicle (e.g., changing of lanes), change in speed (e.g., increase speed to 45 miles per hour), etc.; the feature extractor and rasterization component 508n is configured to process relative lane center ("RelativeLaneCenter"), which, for instance, can be associated with a position of the vehicle in relation to the center lane of a road.

Parameters related to the scene context 513 are transmitted to the feature extractor and rasterization components 508 (a, b, . . . n). Once extracted and rasterized, the parameters 509 and 513 are transmitted to the planner component 510 (and its neural network 512) for generation of one or more future poses parameters 511 as output. The future poses parameters 511 are sampled and concatenated, at 515, and transmitted, at 503, or propagated back to the feature extractor and rasterization components 508 (a, b, . . . n) to become past poses parameters 509, and to begin the above process again.

Figure 5F:
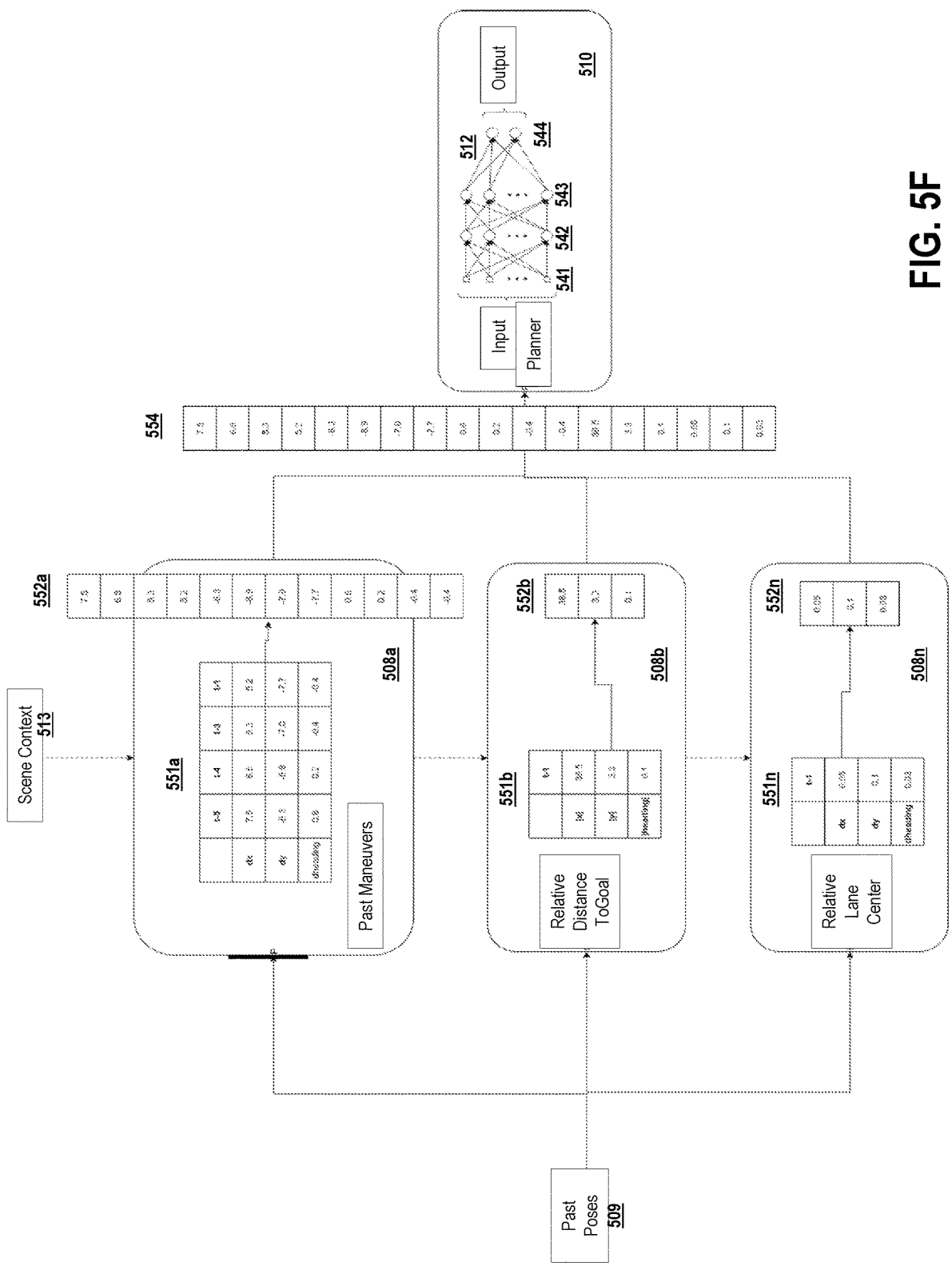
FIG. 5F illustrates examples of feature vectors that can be generated by the feature extractor and rasterization components, according to some embodiments of the current subject matter.

In some embodiments, during the feature extraction and rasterization by the components 508, one or more feature vectors can be generated by the components 508. FIG. 5F illustrates examples of feature vectors that can be generated by the feature extractor and rasterization components 508, according to some embodiments of the current subject matter. As shown in FIG. 5F, component 508a can receive input data (e.g., past poses 509, scene context 513, etc.) 551a, and in particular, the data can represent past maneuvers. The data 551a can be structured, for instance, as a table (or in any other desired fashion). The table 551a can include time-based values of $\Delta x$, $\Delta y$, and $\Delta$heading as determined at times t (e.g., t=1, 3, 4, 5, etc.). Subsequent to processing by the component 508a, table 551a can be converted into a feature vector 552a that includes arrangement of values in the table 551a sorted by time.

Similarly, component 508b can receive input data (e.g., past poses 509, scene context 513, etc.) 551b, and in particular, data can represent relative distance to goal. The data 551b can be also structured, for instance, as a table (or in any other desired fashion). The table 551b can include time-based values of x, y, and heading as determined at time t (e.g., t=1). Subsequent to processing by the component 508b, the table 551b can be converted into a feature vector 552b that includes arrangement of values in the table 551b.

Component 508n can also receive input data (e.g., past poses 509, scene context 513, etc.) 551n, and specifically, as related to relative lane center data. The data 551n can likewise be a table (or be arranged in any other form). The table 551n can include time-based values of $\Delta x$, $\Delta y$, and $\Delta$heading as determined at time t (e.g., t=1). Subsequent to processing, table 551n can be converted into a feature vector 552n that includes arrangement of values in the table 551n.

Figure 5G:
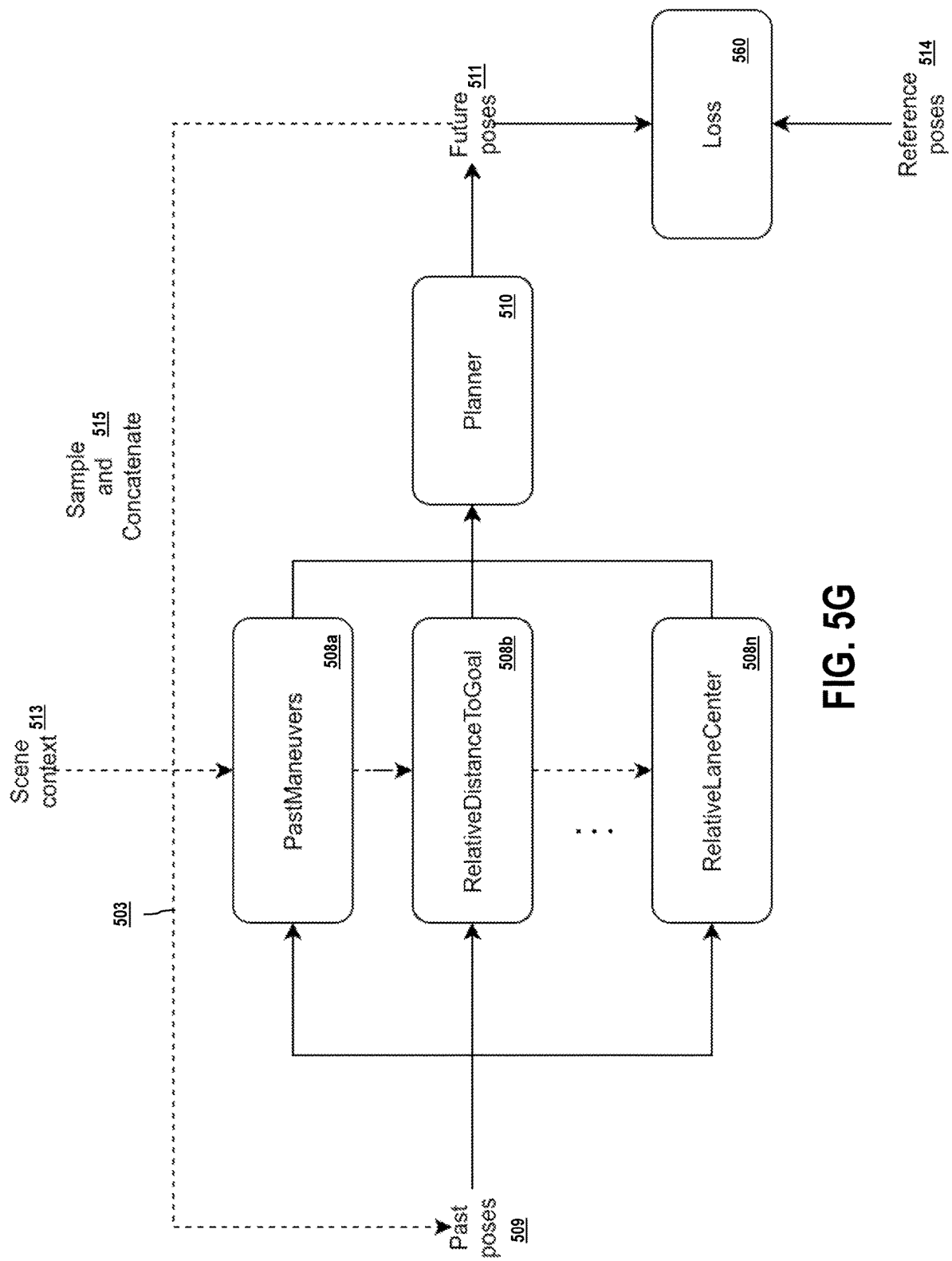
FIG. 5G illustrates a further example experimental implementation of the self-correcting planner system (as shown in FIG. 5A), according to some embodiments of the current subject matter.

The feature vectors 552a, 552b, 552n are then combined or concatenated into a feature vector 554 that combines values from tables 551a, 551b, 551n. The vector 554 is then inputted to the planner component 510 and specifically its neural network 512. The neural network includes a first input layer 541, a first hidden layer 542, a second output layer 543, and an output layer 544. As can be understood, the neural network 512 can be arranged in any desired fashion. The neural network 512 processes the feature vector 554 to generate output that is then propagated back and becomes input to the components 508. As part of the processing by the neural network 512, the poses values of the feature vector are compared to reference parameter values 514 at each time interval t to determine error correction values or loss 560, as illustrated in FIG. 5G.

FIG. 6 illustrates an example process 600 for generating self-correction in a planner component of a vehicle, according to some embodiments of the current subject matter. The process 600 can be performed by the system 500 shown in FIGS. 5A-G. At 602, at least one first parameter (e.g., current, past maneuver(s) of the ego vehicle) are received by the vehicle's controller 504. The first parameters are associated with one or more previous maneuvers of the vehicle. At least one second parameter associated with a maneuver goal of the vehicle is received as well. The parameters are provided to the feature extractor and rasterization components 508.

At 604, the planner component 510 (e.g., upon receiving one or more feature vectors from components 508, as shown in FIG. 5F) generates a future maneuver parameter corresponding to a future maneuver of the vehicle (e.g., entry of the ego vehicle into an adjacent lane, etc.). The planner component 510 uses its neural network 512 to generate future maneuver parameters.

At 606, at least one data model (as discussed above with regard to FIGS. 5B-G) is trained by comparing the generated future maneuver parameter to one or more reference maneuver parameters (e.g., reference maneuvers 514, as determined by an "expert driver"). As a result of the training, a corrected future maneuver parameter (e.g., future maneuver and correction 503) is generated, at 608. The corrected future maneuver parameter includes a future maneuver of the vehicle and a correction to the future maneuver of the vehicle. The corrected future maneuver parameter(s) is then transmitted or back propagated to become past maneuver parameter(s) input to the training process.

Further non-limiting aspects or embodiments are set forth in the following numbered clauses:

Clause 1: A method, comprising receiving, by one or more processors, at least one first set of parameters associated with one or more previous maneuvers of a vehicle and at least one second set of parameters associated with a maneuver goal of the vehicle; generating, by the one or more processors, using the first and second sets of parameters, at least one future maneuver parameter corresponding to at least one future maneuver of the vehicle; training, by the one or more processors, at least one data model by comparing the at least one generated future maneuver parameter to one or more reference maneuver parameters; generating, by the one or more processors, based on the training, at least one corrected future maneuver parameter, the corrected future maneuver parameter including at least one future maneuver of the vehicle and at least one correction to the at least one future maneuver of the vehicle; wherein the at least one first set of parameters includes the generated at least one corrected future maneuver parameter, the generated at least one corrected future maneuver parameter is used to correct at least one first parameter in the at least one first set of parameters, and the training is executed using the corrected at least one first parameter in the at least one first set of parameters.

Clause 2: The method according to clause 1, further comprising executing, by the one or more processors, the generated corrected at least one future maneuver of the vehicle.

Clause 3: The method according to any of the preceding clauses, wherein the receiving further comprises continuously receiving, by the one or more processors, subsequent to each of the executing, the generated at least one corrected future maneuver parameter to correct one or more previously received first parameters in the at least one first set of parameters.

Clause 4: The method according to clause 3, further comprising receiving at least one third parameter associated with a state of the vehicle; wherein the training further comprising training, by the one or more processors, the at least one data model using the future maneuver parameter, the at least one third parameter, and the one or more reference maneuver parameters.

Clause 5: The method according to clause 3, further comprising repeating, by the one or more processors, the receiving, the comparing, the training, and the generating the at least one corrected future maneuver parameter.

Clause 6: The method according to clause 5, wherein the at least one of the first and second sets of parameters correspond to at least one feature associated with at least one maneuver of the vehicle.

Clause 7: The method according to clause 6, further comprising rasterizing the at least one feature.

Clause 8: The method according to clause 7, wherein the training further comprises training, by the one or more processors, the at least one data model using the at least one rasterized feature.

Clause 9: The method according to clause 2, wherein the executing further comprises executing, by the one or more processors, the at least one corrected future maneuver of the vehicle while the vehicle is operating.

Clause 10: The method according to any of the preceding clauses, wherein the at least one first set of parameters and the at least one second set of parameters include at least one of the following: a speed, a position, an acceleration, a direction of movement, and any combination thereof of the vehicle.

Clause 11: The method according to any of the preceding clauses, wherein at least one received first parameter in the at least one first set of parameters is differentiable from at least one of: at least one previously received first parameter in the at least one first set of parameters, and at least one corrected first parameter.

Clause 12: The method according to any of the preceding clauses, wherein at least one received first parameter in the at least one first set of parameters is differentiable from at least one anchor first parameter in the at least one first set of parameters, the at least one anchor first parameter being associated with at least one of: at least one reference feature associated with at least one maneuver of the vehicle and at least one reference maneuver parameter in the one or more reference maneuver parameters.

Clause 13: A system, comprising at least one processor, and at least one non-transitory storage media storing instructions that, when executed by the at least one processor, cause the at least one processor to perform operations of any of the preceding clauses 1-12.

Clause 14: At least one non-transitory storage media storing instructions that, when executed by at least one processor, cause the at least one processor to perform operations of any of the preceding clauses 1-12.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   determining, using at least one processor, based on a first set of parameters and a second set of parameters, at least one future maneuver parameter corresponding to at least one future maneuver of a vehicle;
   generating, using the at least one processor, at least one corrected future maneuver parameter using at least one data model trained by comparing the at least one future maneuver parameter to one or more reference maneuver parameters identified as expert driver maneuver parameters, the at least one corrected future maneuver parameter comprising at least one future maneuver of the vehicle and at least one correction to the at least one future maneuver of the vehicle based on error correction values that indicate a difference between the at least one future maneuver parameter and the one or more reference maneuver parameters; and
   causing, using the at least one processor, the vehicle to execute at least one corrected future maneuver based at least in part on the at least one corrected future maneuver parameter.

2. The method of claim 1, wherein receiving further comprises continuously receiving, using the at least one processor, subsequent to each of executing, the at least one corrected future maneuver parameter to correct one or more previously received first parameters in the first set of parameters.

3. The method of claim 2, further comprising receiving at least one third parameter associated with a state of the vehicle;
   wherein the at least one data model is trained using the future maneuver parameter, the at least one third parameter, and the one or more reference maneuver parameters.

4. The method of claim 2, further comprising
   repeating, using the at least one processor, a training of the at least one data model before generating the at least one corrected future maneuver parameter.

5. The method of claim 4, wherein the first set of parameters and the second set of parameters correspond to at least one feature associated with at least one maneuver of the vehicle.

6. The method of claim 5, further comprising rasterizing the at least one feature as an at least one rasterized feature.

7. The method of claim 6, wherein the at least one data model is trained using the at least one rasterized feature.

8. The method of claim 1, wherein executing further comprises executing, using the at least one processor, the at least one corrected future maneuver of the vehicle while the vehicle is operating.

9. The method of claim 1, wherein the first set of parameters and the second set of parameters comprise at least one of: a speed, a position, an acceleration, a direction of movement, and any combination thereof of the vehicle.

10. The method of claim 1, wherein at least one received first parameter in the first set of parameters is differentiable from at least one of: at least one previously received first parameter in the first set of parameters, and at least one corrected first parameter.

11. The method of claim 1, wherein the expert driver maneuver parameters are associated with at least one of: at least one reference feature associated with at least one maneuver of the vehicle and at least one reference maneuver parameter in the one or more reference maneuver parameters.

12. A system, comprising:
at least one processor, and
at least one non-transitory storage media storing instructions that, when executed by the at least one processor, cause the at least one processor to perform operations comprising:
determining, based on a first set of parameters and a second set of parameters, at least one future maneuver parameter corresponding to at least one future maneuver of a vehicle;
generating at least one corrected future maneuver parameter using at least one data model trained by comparing the at least one future maneuver parameter to one or more reference maneuver parameters identified as expert driver maneuver parameters, the at least one corrected future maneuver parameter comprising at least one future maneuver of the vehicle and at least one correction to the at least one future maneuver of the vehicle based on error correction values that indicate a difference between the at least one future maneuver parameter and the one or more reference maneuver parameters; and
causing the vehicle to execute at least one corrected future maneuver based at least in part on the at least one corrected future maneuver parameter.

13. The system of claim 12, wherein receiving further comprises continuously receiving subsequent to each of executing, the at least one corrected future maneuver parameter to correct one or more previously received first parameters in the first set of parameters.

14. The system of claim 13, wherein the operations further comprise receiving at least one third parameter associated with a state of the vehicle; wherein the at least one data model is trained using the future maneuver parameter, the at least one third parameter, and the one or more reference maneuver parameters.

15. The system of claim 12, wherein the first set of parameters and the second set of parameters correspond to at least one feature associated with at least one maneuver of the vehicle.

16. The system of claim 15, wherein the operations further comprise rasterizing the at least one feature as an at least one rasterized feature.

17. The system of claim 16, wherein the at least one data model is trained using the at least one rasterized feature.

18. The system of claim 12, wherein executing further comprises executing the at least one corrected future maneuver of the vehicle while the vehicle is operating.

19. The system of claim 12, wherein the first set of parameters and the second set of parameters comprise at least one of: a speed, a position, an acceleration, a direction of movement, and any combination thereof of the vehicle.

20. The system of claim 12, wherein at least one received first parameter in the first set of parameters is differentiable from at least one of: at least one previously received first parameter in the first set of parameters, and at least one corrected first parameter.

21. The system of claim 12, wherein the expert driver maneuver parameters are associated with at least one of: at least one reference feature associated with at least one maneuver of the vehicle and at least one reference maneuver parameter in the one or more reference maneuver parameters.

22. A non-transitory storage media storing instructions that, when executed by at least one processor, cause the at least one processor to perform operations comprising:
determining, based on a first set of parameters and a second set of parameters, at least one future maneuver parameter corresponding to at least one future maneuver of a vehicle;
generating at least one corrected future maneuver parameter using at least one data model trained by comparing the at least one future maneuver parameter to one or more reference maneuver parameters identified as expert driver maneuver parameters, the at least one corrected future maneuver parameter comprising at least one future maneuver of the vehicle and at least one correction to the at least one future maneuver of the vehicle based on error correction values that indicate a difference between the at least one future maneuver parameter and the one or more reference maneuver parameters; and
causing the vehicle to execute at least one corrected future maneuver based at least in part on the at least one corrected future maneuver parameter.

23. The non-transitory storage media of claim 22, wherein receiving further comprises continuously receiving subsequent to each of executing, the at least one corrected future maneuver parameter to correct one or more previously received first parameters in the first set of parameters.

* * * * *